US 9,327,735 B2

United States Patent
Bredberg et al.

(10) Patent No.: US 9,327,735 B2
(45) Date of Patent: May 3, 2016

(54) METHOD AND SYSTEM FOR ASSESSMENT OF DRIVER BEHAVIOUR DURING DRIVING OF VEHICLES

(71) Applicant: SCANIA CV AB, Södertälje (SE)

(72) Inventors: Linus Bredberg, Hägersten (SE); Jonny Andersson, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/384,177

(22) PCT Filed: Mar. 21, 2013

(86) PCT No.: PCT/SE2013/050318
§ 371 (c)(1),
(2) Date: Sep. 10, 2014

(87) PCT Pub. No.: WO2013/147685
PCT Pub. Date: Oct. 3, 2013

(65) Prior Publication Data
US 2015/0051790 A1   Feb. 19, 2015

(30) Foreign Application Priority Data

Mar. 29, 2012   (SE) ...................................... 1250311

(51) Int. Cl.
*G01M 17/00*   (2006.01)
*G06F 7/00*   (2006.01)
(Continued)

(52) U.S. Cl.
CPC ............... *B60W 40/09* (2013.01); *G07C 5/085* (2013.01); *G07C 5/0808* (2013.01); *G09B 9/052* (2013.01);
(Continued)

(58) Field of Classification Search
CPC ............ B60W 40/09; B60W 2550/12; B60W 2550/14; B60W 2550/20; B60W 2420/42; B60W 2540/12; B60W 2250/402; G09B 9/052; G07C 5/085; G07C 5/0808
USPC ........................................................ 701/33.4
See application file for complete search history.

(56) References Cited

U.S. PATENT DOCUMENTS 6,092,021 A * 7/2000 Ehlbeck .................... G01L 3/26
701/123
2003/0191573 A1 * 10/2003 Beyer .................. B60T 8/17555
701/70

(Continued)

FOREIGN PATENT DOCUMENTS

EP   0 899 174 A2   3/1999
EP   2 159 122 A2   3/2010

(Continued)

OTHER PUBLICATIONS

International Search Report dated Jun. 28, 2013 issued in corresponding International patent application No. PCT/SE2013/050318.

(Continued)

*Primary Examiner* — Jaime Figueroa
(74) *Attorney, Agent, or Firm* — Ostrolenk Faber LLP

(57) ABSTRACT

A method for assessment of driver behavior during driving by continuously characterizing (S1) the driver's braking processes by determining (S2) the cause of a chosen braking process such as a camera view, map and location data, evasive maneuvers, ambient conditions, road conditions, and assessing (S3) whether the chosen braking process is the appropriate response. Also a system for assessment of driver behavior during driving, a motor vehicle with the system and a computer program for performing the process.

14 Claims, 3 Drawing Sheets

(51) Int. Cl.
*G06F 19/00* (2011.01)
*B60W 40/09* (2012.01)
*G09B 9/052* (2006.01)
*G07C 5/08* (2006.01)

(52) U.S. Cl.
CPC .......... *B60T 2210/32* (2013.01); *B60T 2210/36* (2013.01); *B60T 2220/02* (2013.01); *B60W 2420/42* (2013.01); *B60W 2540/12* (2013.01); *B60W 2550/12* (2013.01); *B60W 2550/14* (2013.01); *B60W 2550/20* (2013.01); *B60W 2550/402* (2013.01)

(56) References Cited

U.S. PATENT DOCUMENTS

| | | | | |
|---|---|---|---|---|
| 2007/0276582 | A1* | 11/2007 | Coughlin | B60W 40/09 701/123 |
| 2008/0042489 | A1* | 2/2008 | Lewis | B60K 6/48 303/152 |
| 2010/0063697 | A1* | 3/2010 | Lindgren | B60W 10/06 701/59 |
| 2011/0251734 | A1* | 10/2011 | Schepp | B60W 50/085 701/1 |
| 2012/0025969 | A1* | 2/2012 | Dozza | B60Q 1/44 340/463 |
| 2012/0212353 | A1* | 8/2012 | Fung | B60K 28/06 340/905 |
| 2013/0096731 | A1* | 4/2013 | Tamari | G06F 11/3013 701/1 |
| 2013/0304334 | A1* | 11/2013 | Fuehrer | G07C 5/008 701/51 |

FOREIGN PATENT DOCUMENTS

| | | |
|---|---|---|
| GB | 2 321 535 A | 7/1998 |
| WO | WO 2005/003885 A2 | 1/2005 |
| WO | WO 2007/139494 A1 | 12/2007 |
| WO | WO 2010/059108 A1 | 5/2010 |
| WO | WO 2010/059111 A1 | 5/2010 |
| WO | WO 2011/133094 A1 | 4/2011 |

OTHER PUBLICATIONS

International Preliminary Report on Patentability dated Jul. 1, 2014 issued in corresponding International patent application No. PCT/SE2013/050318.

European Search Report mailed Oct. 8, 2015 in corresponding European Patent Application No. 13 76 8690.

* cited by examiner

METHOD AND SYSTEM FOR ASSESSMENT OF DRIVER BEHAVIOUR DURING DRIVING OF VEHICLES

CROSS-REFERENCE TO RELATED APPLICATIONS

The present application is a 35 U.S.C. §§371 national phase conversion of PCT/SE2013/050318, filed Mar. 21, 2013, which claims priority of Swedish Patent Application No. 1250311-6, filed Mar. 29, 2012, the contents of which are incorporated by reference herein. The PCT International Application was published in the English language.

TECHNICAL FIELD

The invention relates to a method for assessment of driver behaviour during driving of vehicles. It relates to a system for assessment of driver behaviour during driving of vehicles. It relates also to a motor vehicle. It relates in addition to a computer program and a computer program product.

BACKGROUND

Certain vehicle manufacturers employ driver support in the form of assessment of driver behaviour during driving of vehicles, comprising various categories for assessment, e.g. a hillcrest driving category for assessing how the vehicle is driven at hillcrests, an anticipation category for assessing inter alia the amount of time from releasing the accelerator to braking, and a gearchange category for assessing whether correct gears are used when driving the vehicle. There is also a brake category covering how the brake system is used, assessing to what extent auxiliary brakes are used instead of service brakes/disc brakes in order to minimise wear.

Drivers are then rated on these categories. The brake category is mainly concerned with wear, so low wear, i.e. using the auxiliary brake to a large extent wherever possible, scores a good rating. There is however a problem in that auxiliary brake use in certain situations such as reducing speed along the vehicle's itinerary where the engine brake would really be sufficient to achieve the desired braking causes unnecessary fuel consumption. Even in such situations, the driver scores good ratings despite his/her driving not having been optimum from the fuel consumption perspective.

OBJECTS OF THE INVENTION

One object of the present invention is to propose a method for assessment of driver behaviour during driving of vehicles at the time of braking processes with a view to optimisation of fuel consumption without affecting safety.

One object of the present invention is to propose a system for assessment of driver behaviour during driving of vehicles at the time of braking processes with a view to optimisation of fuel consumption without affecting safety.

SUMMARY OF THE INVENTION

These and other objects indicated by the description set out below are achieved by means of a method and system for assessment of driver behaviour during driving of vehicles, a motor vehicle and a computer program and a computer program product of the kind indicated in the introduction.

The invention achieves the objects with a method for assessment of driver behaviour during driving of vehicles, comprising the step of continuously characterising the driver's chosen braking processes as a basis for said assessment, comprising the steps of determining the cause of a chosen braking process and assessing whether it is the appropriate response to the cause determined. This makes it possible to make a more correct assessment of the driver's intentions at the time of the braking process, enabling assessment of his/her behaviour with regard to both fuel consumption and traffic safety. Optimisation of fuel consumption while maintaining traffic safety is thus made possible. Traffic-safe and fuel-efficient driver behaviour is thus encouraged.

In one embodiment of the method, said braking processes are characterised in terms of auxiliary brakes, service brakes and engine brakes. This makes it possible when assessing driver behaviour at the time of a braking process to determine which from among auxiliary brake, service brake and engine brake the driver should have used and to what extent, and which of them he/she actually used, in order thereby to assess his/her behaviour.

In one embodiment of the method, the step of determination of causes involves the use of camera means, making it possible to detect speed signs and thereby be able to identify that a braking operation was in response to a speed reduction, thereby facilitating the assessment of driver behaviour at the time of the braking process. The camera means also makes it possible to identify any obstacles to the vehicle which relate to the respective braking process, thereby facilitating the assessment of driver behaviour at the time of the braking process.

In one embodiment of the method, the step of determination of causes involves the use of map data and vehicle location determination means. This makes it possible to identify the vehicle's location at the time of the respective braking process and to identify any speed change at the respective braking location, the topography at the braking location, any bend at the braking location and any exit/entry slip at the braking location, in order thereby to facilitate the assessment of driver behaviour at the time of the respective braking process.

In one embodiment of the method, the step of determination of causes involves the use of means for recording evasive manoeuvres. This makes it easier to assess driver behaviour at the time of the braking process in that his/her intentions are easier to assess when it is possible to detect such a manoeuvre which requires him/her to follow a certain braking procedure, probably involving service brake use.

In one embodiment the method further comprises the step of continuously determining conditions in which the vehicle is driven, which are taken into account in said assessment. Said conditions comprise traffic situation, time of day, weather, vehicle load, vehicle speed, type of road, e.g. motorway, national highway etc. The assessment of driver behaviour at the time of the braking process is thus facilitated, enabling more correct assessment.

In one embodiment of the method, the step of determination of causes involves using means for determining road state characteristics such as wet road surface, gravel road and the like which might affect a braking process. The assessment of driver behaviour at the time of the braking process is thus facilitated.

The invention also achieves the objects with a system for assessment of driver behaviour during driving of vehicles, comprising means for continuously characterising the driver's chosen braking processes as a basis for said assessment, comprising means for determining the cause of a chosen braking process and means for assessing whether it is the appropriate response to said cause determined. This makes it possible to make a more correct assessment of the driver's intentions at the time of the braking process, enabling assessment of his/her behaviour with regard to both fuel consumption and traffic safety. Optimisation of fuel consumption while maintaining traffic safety is thus made possible. Traffic-safe and fuel-efficient driver behaviour is thus encouraged.

In one embodiment of the system, said braking processes are characterised in terms of auxiliary brakes, service brakes and engine brakes. This makes it possible when assessing driver behaviour at the time of a braking process to determine which from among auxiliary brake, service brake and engine brake driver should have used and to what extent, and which of them he/she actually used, in order thereby to assess his/her behaviour.

In one embodiment of the system, said means for determination of causes comprise camera means, making it possible to detect speed signs and thereby be able to identify that a braking operation was in response to a speed reduction, thereby facilitating the assessment of driver behaviour at the time of the braking process. The camera means also makes it possible to identify any obstacles to the vehicle which relate to the respective braking process, thereby facilitating the assessment of driver behaviour at the time of the braking process.

In one embodiment of the system, said means for determination of causes comprise a map information unit for map data and vehicle location determination means. This makes it possible to identify the vehicle's location at the time of the respective braking process and to identify any speed change at the respective braking location, the topography at the braking location, any bend at the braking location and any exit/entry slip at the braking location, in order thereby to facilitate the assessment of driver behaviour at the time of the respective braking process.

In one embodiment of the system, said means for determination of causes comprise means for recording evasive manoeuvres. This makes it easier to assess driver behaviour at the time of the braking process in that his/her intentions are easier to assess when it is possible to detect such a manoeuvre which requires him/her to follow a certain braking procedure, probably involving service brake use.

In one embodiment the system further comprises means for continuously determining conditions in which the vehicle is driven, which are taken into account in said assessment. Said conditions comprise ambient conditions, including traffic situation, time of day, weather, vehicle load, vehicle speed, type of road, e.g. motorway, national highway etc. The assessment of driver behaviour at the time of the braking process is thus facilitated, enabling more correct assessment.

In one embodiment of the system, said means for determination of causes comprise means for determining road state characteristics such as wet road surface, gravel road and the like which might affect a braking process. The assessment of driver behaviour at the time of the braking process is thus facilitated.

DESCRIPTION OF DRAWINGS

The present invention will be better understood by reading the detailed description set out below in conjunction with the attached drawings, in which the same reference notations are used for similar items throughout the various views, and FIG. 1 schematically illustrates a motor vehicle according to an embodiment of the present invention.

DESCRIPTION OF EMBODIMENTS

The term "link" refers herein to a communication link which may be a physical connection such as an opto-electronic communication line, or a non-physical connection such as a wireless connection, e.g. a radio link or microwave link.

Figure 1:
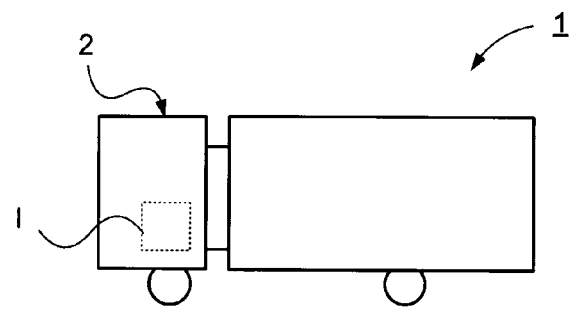

FIG. 1 illustrates schematically a motor vehicle 1 according to an embodiment of the present invention. The vehicle exemplified is a heavy vehicle in the form of a truck. It may alternatively be any suitable vehicle, e.g. a bus or a car. The vehicle is provided with a system I according to the present invention.

Figure 2:
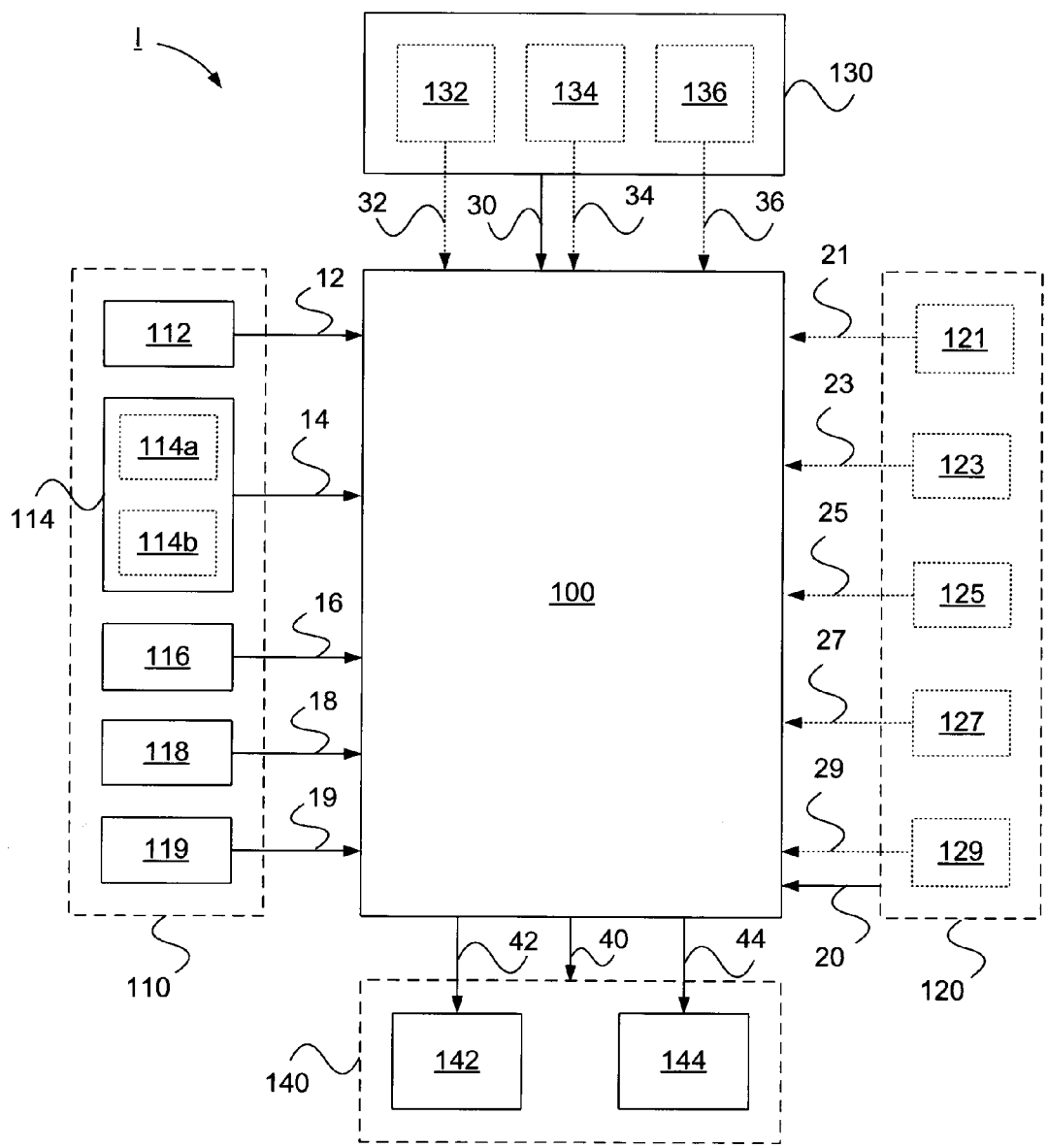
FIG. 2 schematically illustrates a system for assessment of driver behaviour during driving of vehicles according to an embodiment of the present invention.

FIG. 2 is a schematic block diagram of a system I for assessment of driver behaviour during driving of vehicles according to an embodiment of the present invention.

The system I comprises an electronic control unit 100 for said assessment.

The system comprises means 110 for determining the cause of a chosen braking process.

Said means 110 for determining the cause of a chosen braking process comprise camera means 112. The system I is thus provided with camera means for determining the cause of a chosen braking process. Said camera means is adapted to detecting speed signs along the vehicle's itinerary in order to identify speed changes along it. Said camera means is adapted in one variant to detecting not only speed signs but also other objects along the vehicle's itinerary such as prospective obstacles to its movement, e.g. cyclists, road users, wildlife, fallen trees or the like.

Said means 110 for determining the cause of a chosen braking process comprise itinerary determination means 114. The system I is thus provided with itinerary determination means for determining the cause of chosen braking processes. Said itinerary determination means are adapted to providing predetermined characteristics of the carriageway along the vehicle's itinerary and the vehicle's location along it.

Said itinerary determination means 114 comprise in one variant a map information unit 114a containing map data comprising said characteristics of the carriageway, e.g. topography at the braking location, any bend at the braking location and any exit/entry slip at the braking location, in order thereby to facilitate the assessment of driver behaviour at the time of the respective braking process.

Said itinerary determination means 114 further comprises vehicle location determination means 114b in the form of a geographical position determination system, i.e. GPS, to identify the vehicle's location at the time of the respective braking process.

The itinerary determination means 114, i.e. the map information unit 114a and the vehicle location determination means 114b, thus make it possible at the time of the respective braking process to identify the vehicle's location and to identify any speed change at the respective braking location.

Said means 110 for determining the cause of a chosen braking process comprise evasive manuoevre recording means 116 to record evasive manoeuvres. The system I is thus provided with evasive manuoevre recording means, which in one variant comprises lateral acceleration sensor means.

Said means 110 for determining the cause of a chosen braking process comprise spacing distance determination means 118 for continuously determining spacing between the vehicle and a vehicle in front or equivalent, and relative speeds between the vehicle and those in front. The system I is thus provided with spacing distance determination means which takes in one variant the form of a radar means and/or laser measuring means. The spacing distance determination means thus serves as a supplement to the camera means 112 for the assessment of the braking process.

The system I further comprises driving conditions determination means 120 for determination of conditions in which the vehicle is driven. Said conditions comprise traffic situation, time of day with a view to assessing whether it was dark at the time of the respective braking process, weather, e.g. any precipitation and its type, and outdoor temperature, vehicle load, vehicle speed, type of road, e.g. motorway or national highway, etc.

Said driving conditions determination means 120 comprise in one variant traffic situation determination means 121 for determining the traffic situation at the time of the respective braking process. Said traffic situation determination means comprises in one variant communication means incorporating radio units and/or so-called wireless LAN or WLAN for determining the traffic situation at the time of the respective braking process. Said traffic situation determination means comprises in one variant sensor means on board the vehicle to monitor other vehicles in the vicinity and other objects such as other road users, e.g. cyclists or pedestrians, or obstacles to the vehicle at the time of the respective braking process. Said sensor means may take the form of camera means, radar means and/or laser measuring means.

Said driving conditions determination means 120 further comprise in one variant time determination means 123 for determining the time at which the respective braking process takes place.

Said driving conditions determination means 120 further comprise in one variant weather determination means 125 for determining weather conditions at the time of the respective braking process. Said weather determination means may comprise rain sensor means, weather information receiving means to receive weather information via radio or equivalent.

Said driving conditions determination means 120 further comprise in one variant speed determination means 127 for determining vehicle speed at the time of the respective braking process. Said speed determination means comprises in one variant speedometer means.

Said driving conditions determination means 120 further comprise in one variant road type determination means 129 for determining the type of road at the time of the respective braking process, which in one variant is provided via said map data from the map information unit 114a of the itinerary determination means 114. This makes it easier to assess driver behaviour at the time of the braking process, making more accurate assessment possible.

Said means 110 for determining the cause of a chosen braking process further comprise road state characteristics determination means 119 for determining road state characteristics. The system I is thus provided with road state characteristics determination means. Road state characteristics comprise running surfaces such as wet road surfaces, gravel roads and the like which might affect a braking process. The assessment of driver behaviour at the time of the braking process is thus facilitated. Said road state characteristics determination means may comprise any suitable means for road state determination, e.g. friction sensor means, temperature means to determine ambient and/or road temperatures, and the like.

The system I further comprises brake process determination means 130 for determining the vehicle's braking processes.

Said brake process determination means 130 comprise service brake determination means 132 for determining whether and, if so, to what extent service brake means, e.g. footbrakes, were used at the time of the respective braking process.

Said brake process determination means 130 further comprise auxiliary brake determination means 134 for determining whether and, if so, to what extent auxiliary brake means were used at the time of the respective braking process.

Said brake process determination means 130 further comprise engine brake determination means 136 for determining whether and, if so, to what extent engine brake means were used at the time of the respective braking process.

The system I further comprises brake process determination receiving means 140 to receive information about assessment of braking processes.

Said brake process determination receiving means 140 comprise a vehicle display unit 142 situated in the vehicle's instrument cluster to inform the driver about assessment of current braking processes to enable him/her to immediately become aware of his/her driving behaviour at the time of the braking process.

Said brake process determination receiving means 140 comprise separate receiving units 144 for receiving and recording assessments of driver behaviour at the time of braking processes. This may include receiving units at the haulier's premises to make it possible to see the results of assessments of driver behaviour during braking processes.

The electronic control unit 100 is signal-connected to said camera means 112 via a link 12, enabling it to receive from said means a signal which represents object data comprising in one variant speed limit information data from speed signs, for determining the cause of chosen braking processes.

The electronic control unit 100 is signal-connected to said itinerary determination means 114 via a link 14, enabling it to receive from said means a signal which represents itinerary data comprising location data from the vehicle location determination means 114b and the map data from the map information unit 114a, for determining the cause of chosen braking processes.

The electronic control unit 100 is signal-connected to said evasive maneuver recording means 116 via a link 16, enabling it to receive from said means a signal which represents evasive manoeuvre data, for determining the cause of chosen braking processes.

The electronic control unit 100 is signal-connected to said spacing distance determination means 118 via a link 18, enabling it to receive from said means a signal which represents spacing data relative to vehicles in front, for determining the cause of chosen braking processes.

The electronic control unit 100 is signal-connected to said road state characteristics determination means 119 via a link 19, enabling it to receive from said means a signal which represents road state data.

The electronic control unit 100 is signal-connected to said driving conditions determination means 120 via a link 20, enabling it to receive from said means a signal which represents conditions data for determination of driving conditions in which the vehicle is driven.

The electronic control unit 100 is signal-connected to said traffic situation determination means 121 via a link 21, enabling it to receive from said means a signal which represents traffic situation data.

The electronic control unit 100 is signal-connected to said time determination means 123 via a link 23, enabling it to receive from said means a signal which represents time data for the time of day at which said braking process took place in order thereby to determine whether night driving conditions prevailed.

The electronic control unit 100 is signal-connected to said weather determination means 125 via a link 25, enabling it to receive from said means a signal which represents weather data for determining the weather conditions which prevailed at the time of the braking process.

The electronic control unit 100 is signal-connected to said speed determination means 127 via a link 27, enabling it to receive from said means a signal which represents speed data for determining the speed at which the vehicle was being driven close to the braking process.

The electronic control unit 100 is signal-connected to said road type determination means 129 via a link 29, enabling it to receive from said means a signal which represents the type of road on which the vehicle was being driven at the time of the braking process.

The electronic control unit 100 is signal-connected to said brake process determination means 130 via a link 30, enabling it to receive from said means a signal which represents brake data about the type of brake means used and to what extent during the braking process.

The electronic control unit 100 is signal-connected to said service brake determination means 132 via a link 32, enabling it to receive from said means a signal which represents service brake data about the extent to which service brake means were used during the braking process.

The electronic control unit 100 is signal-connected to said auxiliary brake determination means 134 via a link 34, enabling it to receive from said means a signal which represents auxiliary brake data about the extent to which auxiliary brake means were used during the braking process.

The electronic control unit 100 is signal-connected to said engine brake determination means 136 via a link 36, enabling it to receive from said means a signal which represents engine brake data about the extent to which engine brake means were used during the braking process.

The electronic control unit 100 is adapted to processing said object data from the camera means 112 comprising data about speed limits from speed signs during said braking process and/or said map data from the map information unit 114*a* of the itinerary determination means 114 comprising speed limits, topology and any bends, for determining the cause of said braking, and said brake data from the brake process determination means 130 in order thereby to assess whether the chosen braking process is the appropriate response to said cause determined.

In addition to the aforesaid processing, the electronic control unit 100 is in one variant adapted to processing said evasive manoeuvre data in order to assess whether the vehicle executed at the time of the braking process an evasive manoeuvre, and/or spacing data for determining distances from any vehicles in front at the time of the braking process, in order to determine the cause of said braking, and/or road state data for assessing the road state which prevailed at the time of the braking process, in conjunction with said brake data, in order thereby to assess whether the chosen braking process is the appropriate response to said cause determined.

In addition to the aforesaid processing, the electronic control unit 100 is in one variant adapted to processing said conditions data in order to determine the conditions in which the vehicle was being driven at the time of the braking process, in conjunction with said brake data, in order thereby to assess whether the chosen braking process is the appropriate response to said cause. Said conditions data comprise in one variant said traffic situation data, time data, weather data, speed data and/or road type data.

The electronic control unit 100 is signal-connected to said brake process determination receiving means 140 via a link 40, enabling it to send to said means a signal which represents braking process determination data for the results of driver behaviour at the time of the braking process.

The electronic control unit 100 is signal-connected to said vehicle display unit 142 via a link 42, enabling it to send to said unit a signal which represents braking process determination data for the results of driver behaviour at the time of the braking process.

The electronic control unit 100 is signal-connected to said receiving unit 144 via a link 44, enabling it to send to said unit a signal which represents braking process determination data for the results of driver behaviour at the time of the braking process.

Figure 3:
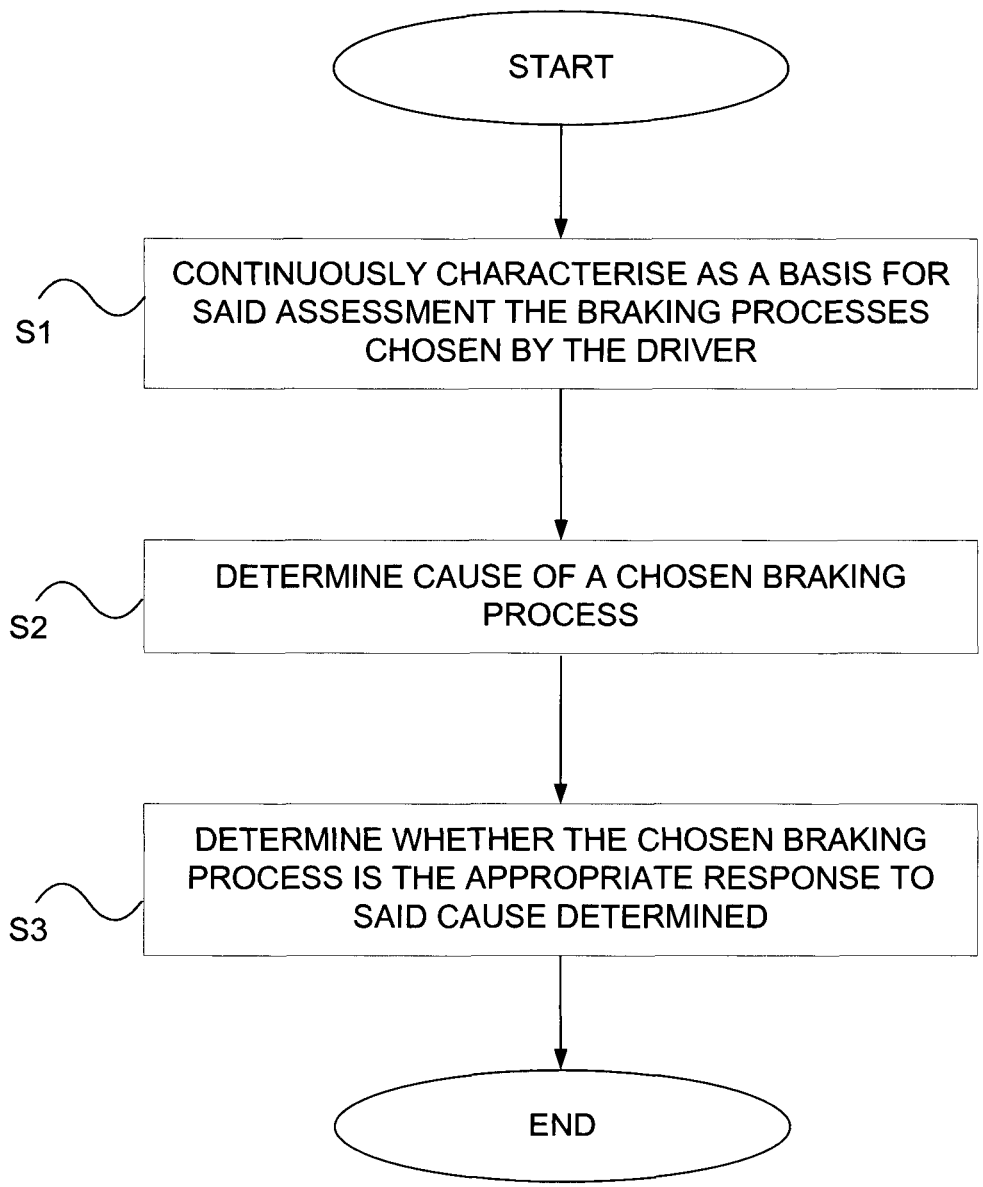
FIG. 3 is a schematic block diagram of a method according to the present invention, and FIG. 4 schematically illustrates a computer according to an embodiment of the present invention.

FIG. 3 is a schematic block diagram of a method for assessment of driver behaviour during driving of vehicles according to an embodiment of the present invention.

In one embodiment the method for assessment of driver behaviour during driving of vehicles comprises a first step S1 which continuously characterises the driver's chosen braking processes as a basis for said assessment.

In one embodiment the method for assessment of driver behaviour during driving of vehicles comprises a second step S2 which continuously determines the cause of a chosen braking process.

In one embodiment the method for assessment of driver behaviour during driving of vehicles comprises a third step S3 which assesses whether the chosen braking process is the appropriate response to said cause determined.

Figure 4:
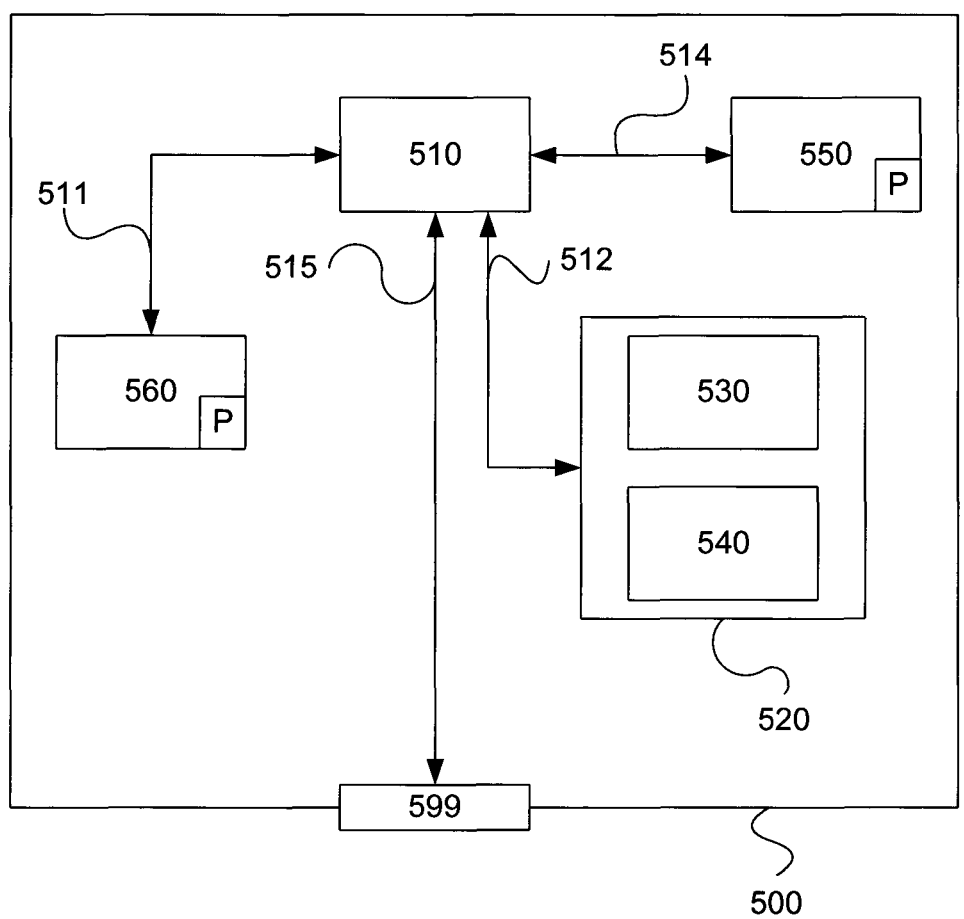

FIG. 4 is a diagram of one version of a device 500. The control unit 100 described with reference to FIG. 2 may in one version comprise the device 500. The device 500 comprises a non-volatile memory 520, a data processing unit 510 and a read/write memory 550. The non-volatile memory has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory has also a second memory element 540.

A proposed computer program P comprises routines for assessment of driver behaviour during driving of vehicles according to the innovative method. The program P comprises routines for continuously characterising the driver's chosen braking processes as a basis for said assessment. It comprises routines for determining the cause of a chosen braking process. It comprises routines for assessing whether the chosen braking process is the appropriate response to said cause determined. The program P may be stored in an executable form or in compressed form in a memory 560 and/or in a read/write memory 550.

Where the data processing unit 510 is described as performing a certain function, it means that it conducts a certain part of the program stored in the memory 560, or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514. The links associated for example with the control unit 100 may be connected to the data port 599.

When data are received on the data port 599, they are stored temporarily in the second memory element 540. When input data received have been temporarily stored, the data processing unit 510 is prepared to conduct code execution as described above. The signals received on the data port 599 may be used by the device 500 to continuously characterise the driver's chosen braking processes as a basis for said assessment. The signals received on the data port 599 may be used by the device 500 to determine the cause of a chosen braking process. The signals received on the data port 599 may be used by the device 500 to assess whether the chosen braking process is the appropriate response to said cause determined.

Parts of the methods herein described may be conducted by the device 500 by means of the data processing unit 510 which runs the program stored in the memory 560 or the read/write memory 550. When the device 500 runs the program, methods herein described are executed.

The above description of the preferred embodiments of the present invention is provided for illustrative and descriptive purposes. It is not intended to be exhaustive nor to restrict the invention to the variants described. Many modifications and variations will obviously suggest themselves to one skilled in the art. The embodiments have been chosen and described in order best to explain the principles of the invention and their practical applications and thus make it possible for one skilled in the art to understand the invention for different embodiments and with the various modifications appropriate to the intended use.

The invention claimed is:

1. A method for assessment of driver behavior during driving of a vehicle, the method being performed by an electronic control unit and comprising the steps of:
    continuously characterising a driver's chosen braking processes as a basis for said assessment based on first data from at least one first sensor recording the chosen braking processes;
    determining a cause of a chosen braking process based on at least one of second data from at least one second sensor, the second data being sensed during the chosen braking process, and on third data recorded prior to the chosen braking process; and
    assessing whether the chosen braking process is an appropriate response to the cause determined,
    the chosen braking process being characterised based on whether, and to what extent, auxiliary brakes, service brakes and engine brakes of the vehicle were used during the chosen braking process, the assessment of whether the chosen braking process is the appropriate response being based on the effect of the chosen braking process on fuel consumption and traffic safety.

2. The method according to claim 1, in which the step of determination of the cause involves the use of camera means.

3. The method according to claim 1, in which the step of determination of the cause involves the use of map data and vehicle location determination means.

4. The method according to claim 1, in which the step of determination of the cause involves using means for recording of evasive maneuvers of the vehicle.

5. The method according to claim 1, further comprising the step of continuously determining driving conditions in which the vehicle is driven and taking the driving conditions into account in the assessment.

6. The method according to claim 1, in which the step of determination of the cause involves the use of means for determining road state characteristics.

7. A system for assessment of driver behavior during driving of a vehicle, comprising
    means for continuously characterising the driver's chosen braking processes as a basis for the assessment,
    means for determining a cause of a chosen braking process, and
    means for assessing whether the chosen braking process is an appropriate response to the cause determined,
    the chosen braking process being performed by at least one of: auxiliary brakes, service brakes and engine brakes of the vehicle, the assessment of whether the chosen braking process is the appropriate response being based on the effect of the chosen braking process on fuel consumption and traffic safety.

8. The system according to claim 7, in which the means for determination of the cause comprise camera means.

9. The system according to claim 7, in which the means for determination of the cause comprise a map information unit for supplying map data and comprise a vehicle location determination means.

10. The system according to claim 7, in which the means for determination of the cause comprise means for recording of evasive maneuvers.

11. The system according to claim 7, further comprising means for continuously determining conditions under which the vehicle is driven, and the conditions are taken into account in the assessment.

12. The system according to claim 7, in which the means for determination of the cause comprise means for determining road state characteristics.

13. A vehicle provided with the system according to claim 7.

14. A non-transitory computer-readable medium on which is recorded a computer program for assessment of driver behavior during driving of a vehicle, the program comprising program code which, when run by an electronic control unit or another computer connected to the electronic control unit, enables the electronic control unit to perform the steps of:
    continuously characterising a driver's chosen braking processes as a basis for said assessment based on first data from at least one first sensor recording the chosen braking processes;
    determining a cause of a chosen braking process based on at least one of second data from at least one second sensor, the second data being sensed during the chosen braking process, and on third data recorded prior to the chosen braking process; and
    assessing whether the chosen braking process is an appropriate response to the cause determined,
    the chosen braking process being characterised based on whether, and to what extent, auxiliary brakes, service brakes, and engine brakes of the vehicle were used during the chosen braking process, the assessment of whether the chosen braking process is the appropriate response being based on the effect of the chosen braking process on fuel consumption and traffic safety.

* * * * *